United States Patent
Yeo et al.

(10) Patent No.: US 12,438,705 B2
(45) Date of Patent: Oct. 7, 2025

(54) YES AND NO SECRET SHARING WITH HIDDEN ACCESS STRUCTURES

(71) Applicant: Seagate Technology LLC, Fremont, CA (US)

(72) Inventors: Foo Yee Yeo, Shugart (SG); Vipin Singh Sehrawat, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 18/610,167

(22) Filed: Mar. 19, 2024

(65) Prior Publication Data
US 2024/0223359 A1    Jul. 4, 2024

Related U.S. Application Data

(62) Division of application No. 17/219,496, filed on Mar. 31, 2021, now Pat. No. 11,956,350.

(51) Int. Cl.
*H04L 9/08*   (2006.01)
*H04L 9/06*   (2006.01)

(52) U.S. Cl.
CPC ........... *H04L 9/085* (2013.01); *H04L 9/0656* (2013.01)

(58) Field of Classification Search
CPC . H04L 9/3247; H04L 63/0823; H04L 63/123; H04L 63/061; H04L 67/325;
(Continued)

(56) References Cited

U.S. PATENT DOCUMENTS 6,606,663 B1 * 8/2003 Liao .............. H04L 63/0884
                                                     705/25
6,895,501 B1 * 5/2005 Salowey ......... H04L 63/126
                                                     713/168
(Continued)

FOREIGN PATENT DOCUMENTS

WO         2001020562 A2    3/2001

OTHER PUBLICATIONS

Beutelspacher, Albrecht, "How to say \no", In Advances in Cryptology—EUROCRYPT '89, Workshop on the Theory and Application of Cryptographic Techniques, Houthalen, Belgium, Proceedings, vol. 434, 1989, 491-496.
(Continued)

*Primary Examiner* — Sharif E Ullah
(74) *Attorney, Agent, or Firm* — HOLZER PATEL DRENNAN

(57) ABSTRACT

A secret sharing scheme with yes and no shares and having a hidden access structure. The secret sharing scheme may include share generation in which yes shares and no shares are generated for, and distributed to, each party in the secret sharing scheme. In turn, upon an attempt to reconstruct the secret, participants in the reconstruction each provide a share, which is unknown to be a yes share or a no share to the other participants. The secret is only reconstructable if the shares used in the reconstruction include yes shares of a minimal authorized subset of the parties. However, prior to secret reconstruction, the access structure remains hidden and the participants in a reconstruction are unaware of the character of the shares provided by other participants in the reconstruction attempt.

10 Claims, 5 Drawing Sheets

(58) Field of Classification Search
CPC ... H04L 69/28; H04L 2209/76; H04L 9/0825; H04L 67/145; H04L 67/2833; H04L 9/085; H04W 4/18; H04W 28/0273; H04W 28/06; H04W 4/02; H04W 4/12; H04W 4/70; H04W 52/0203; G06F 11/1451; G06F 11/1461; G06F 11/1464; G06F 17/30091; G06F 17/30569; G06F 21/34
USPC ........ 380/286, 255, 264, 276; 713/2, 21, 36; 726/2, 21, 36
See application file for complete search history.

(56) References Cited

U.S. PATENT DOCUMENTS

| | | | |
|---|---|---|---|
| 7,480,635 B2* | 1/2009 | Saar | G06Q 30/0248 705/50 |
| 7,587,366 B2* | 9/2009 | Grim, III | G06Q 30/02 705/52 |
| 8,340,283 B2* | 12/2012 | Nadalin | H04L 9/006 380/28 |
| 9,037,511 B2* | 5/2015 | Roth | G06F 9/44505 705/50 |
| 9,483,657 B2* | 11/2016 | Paul | G06F 21/6245 |
| 9,536,268 B2* | 1/2017 | Serena | H04L 51/52 |
| 2002/0069369 A1* | 6/2002 | Tremain | H04L 63/1408 709/224 |
| 2004/0174875 A1* | 9/2004 | Geagan, III | H04N 21/44016 375/E7.025 |
| 2006/0004662 A1* | 1/2006 | Nadalin | H04L 63/0823 705/50 |
| 2006/0206904 A1* | 9/2006 | Watkins | G06F 9/45537 719/321 |
| 2007/0171921 A1* | 7/2007 | Wookey | H04L 63/10 707/E17.013 |
| 2008/0181398 A1* | 7/2008 | Pappu | H04L 9/085 380/28 |
| 2009/0119504 A1* | 5/2009 | van Os | H04L 9/083 713/153 |
| 2009/0282266 A1* | 11/2009 | Fries | G06F 21/602 713/193 |
| 2009/0288167 A1* | 11/2009 | Freericks | G06F 21/554 726/23 |
| 2010/0125856 A1* | 5/2010 | Dash | G06F 9/45545 719/321 |
| 2010/0162235 A1* | 6/2010 | Ginzton | G06F 9/50 718/1 |
| 2011/0016322 A1* | 1/2011 | Dean | H04L 9/0844 713/171 |
| 2011/0141124 A1* | 6/2011 | Halls | G06F 21/85 345/522 |
| 2011/0231443 A1* | 9/2011 | Hannel | H04L 63/0428 707/E17.014 |
| 2011/0302042 A1* | 12/2011 | Hatakeyama | H04M 1/72412 705/26.1 |
| 2011/0302650 A1* | 12/2011 | Brown | G06F 21/562 711/E12.091 |
| 2012/0196566 A1* | 8/2012 | Lee | H04M 15/80 455/408 |
| 2013/0006840 A1* | 1/2013 | Cahn | G06Q 20/401 705/37 |
| 2013/0007459 A1* | 1/2013 | Godfrey | H04L 51/066 713/175 |

OTHER PUBLICATIONS

Jackson, Wen-Ai, et al., "Geometrical contributions to secret sharing theory", Journal of Geometry, 79, 2004, 102-133.
Sehrawat, Vipin Sing, et al., "Access structure hiding secret sharing from novel set systems and vector families", COCOON, 2020, 246-261.

* cited by examiner

YES AND NO SECRET SHARING WITH HIDDEN ACCESS STRUCTURES

CROSS REFERENCE TO RELATED APPLICATIONS

This application is a divisional filing under 35 U.S.C. § 120 of U.S. patent application Ser. No. 17/219,496 filed on Mar. 31, 2021 entitled YES AND NO SECRET SHARING WITH HIDDEN ACCESS STRUCTURES, the entirety of which is incorporated by reference herein.

BACKGROUND

Secret sharing allows a secret to be shared amongst a plurality of parties in a secret sharing scheme so that an authorized subset of parties specified by an access structure can reconstruct the secret by combining shares of the secret from the authorized subset of parties. Secret sharing may be utilized in computer networks to share secrets in the form of data shares provided to participating entities or computer devices in a network. Prior to secret reconstruction using the shares of the authorized subset of parties, the secret cannot be reconstructed by any individual ones of the parties. In one example of a secret sharing scheme, a threshold is established corresponding to a given number of participants who must participate in an effort to reconstruct the secret to successfully reconstruct the secret. In such a scheme, a total number of parties (n) are provided shares such that a threshold number of parties (t) must provide their shares for secret reconstruction to be successful. This is often referred to as a threshold access structure or a (t, n)-threshold scheme. In the traditional (t, n)-threshold scheme, the authorized subset of participates required to reconstruct the secret is defined by a publicly known access structure. That is, all parties know that so long as a threshold (t) or greater number of participants provide shares, the secret can be reconstructed.

SUMMARY

The present disclosure relates to a secret sharing scheme that includes yes and no secret sharing in which hidden access structures are provided. Through such a secret sharing scheme, each party in the secret sharing scheme receives a yes share and a no share. Yes shares of a minimal authorized subset defined by a hidden access structure is needed to reconstruct a secret. However, the minimal authorized subset is not publicly known amongst the parties of the secret sharing scheme. Moreover, a given party's yes share and no share is indistinguishable to other parties in the scheme. Therefore, the exploitability address above may be resolved as participants attempting to reconstruct a secret may not simply discard participant shares in an attempt to reach a threshold number of yes shares as is the case in the threshold access structure.

Moreover, the secret sharing scheme described herein allows participants to have deniability regarding whether a yes share or a no share was provided. Thus, a qualified minority of participants may deny secret reconstruction without providing any information to the other participants regarding the objective of a participant. This is because a given party's yes and no share is indistinguishable to other participants and the access structure is not revealed until and unless the secret is reconstructed.

Accordingly, the present disclosure generally relates to a yes and no secret sharing scheme with a hidden access structure. The disclosure includes choosing a random basis for a vector space. The random basis includes a plurality of basis vectors that can be used to form any given vector in the vector space in a unique manner. A target vector is calculated that corresponds to a secret from a target subset of the plurality of basis vectors. Also, a random vector is chosen from the vector space.

In turn, for a plurality of participating entities participating in the secret sharing scheme, a corresponding plurality of yes shares are generated as a function of a basis vector from the plurality of basis vectors and the random vector. The plurality of yes shares comprise authorized yes shares generated as a function of a basis vector from the target subset of the plurality of basis vectors. The secret is only reconstructable by a computation of the target vector in an operation including all of the authorized yes shares. However, also generated are, for each of a plurality of entities participating in the secret sharing scheme, a no share as a function of a basis vector outside the target subset of the plurality basis vectors and the random vector. A yes share and a no share is distributed to each of the plurality of entities participating in the secret sharing scheme. The authorized yes shares are distributed to a minimal authorized subset of the plurality of entities participating in the secret sharing scheme.

In turn, secret reconstruction may be attempted by obtaining shares of unknown characteristic from a participating subset of the participants in the secret sharing scheme. The shares are processed in a reconstruction algorithm in an attempt to reconstruct the secret. Only if the shares obtained include the yes shares of a minimal authorized subset is the secret reconstructable. Prior to secret reconstruction, the characteristic of the shares provided as well as the identity of the minimal authorized subset is not known and no failed attempt at secret reconstruction provides information regarding the access structure or characteristic of shares provided in a failed attempt.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
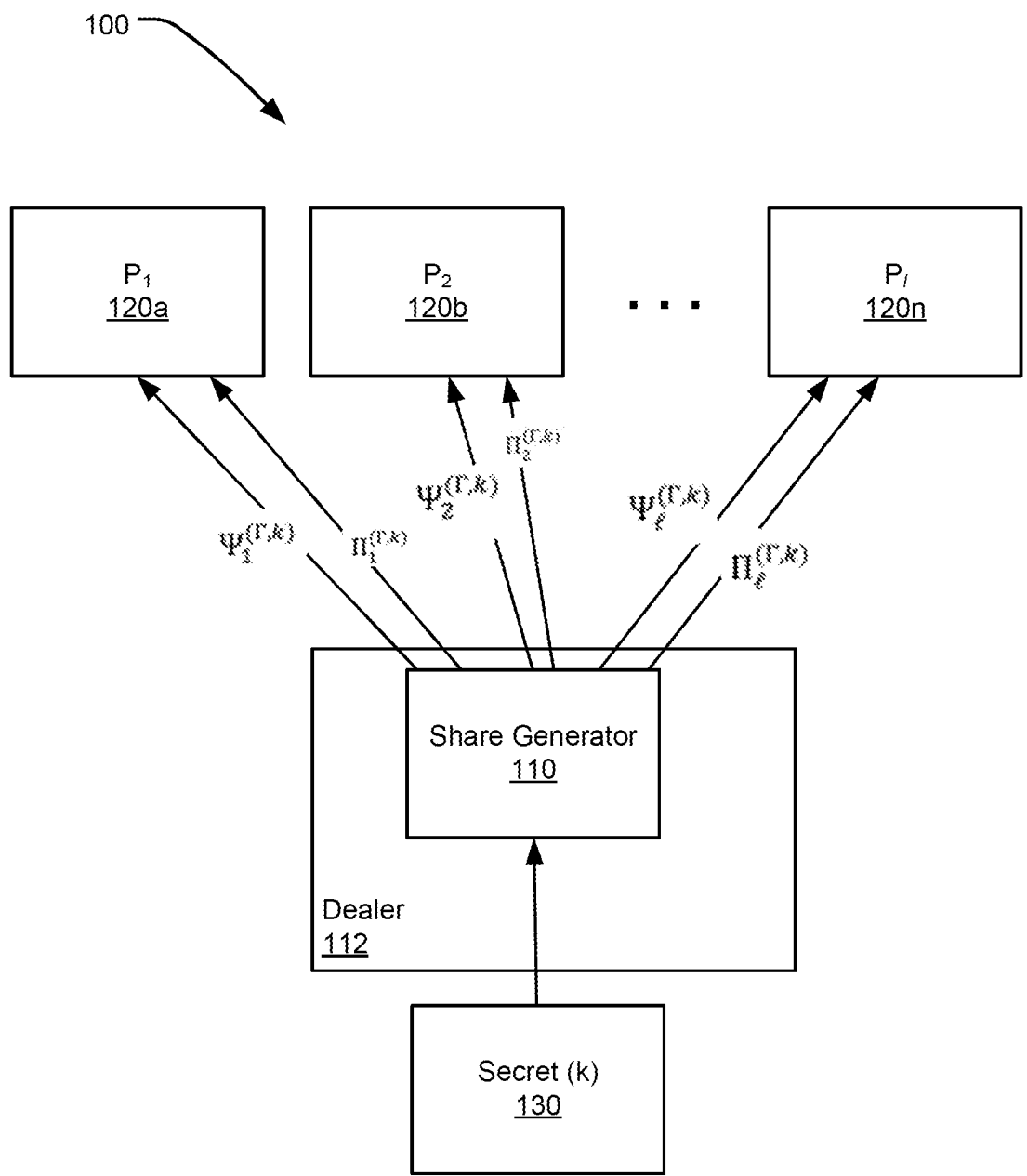
FIG. 1 illustrates an example of share generation in a secret sharing scheme in which yes shares and no shares are generated in relation to a hidden access structure.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

In many situations, it may be desirable that participants be able to deny secret reconstruction. For example, one or more participants may want to deactivate a master key during certain times. Secret sharing schemes that include "yes and no" secret sharing have been proposed where a qualified minority is able to deny reconstruction of the secret. In yes and no secret sharing, each party in the secret sharing scheme receives both a yes share and a no share. The yes share of a participant is used to participate in secret reconstruction with an input towards the secret reconstruction. In contrast, a no share provides an option to participate, even if secret reconstruction is not desired by the participant providing the no share. If a sufficient number of parties contribute their no shares, the secret should not be reconstructable.

While yes and no secret sharing has been proposed in a relatively simple form, the need to further improve on such secret sharing schemes continues to exist. For instance, proposed approaches to yes and no secret sharing only support the threshold access structure illustrated above that are publicly known to the participating entities. For instance, in a (3, 5) threshold scheme, it is publicly known amongst the parties that any three participants out of the total five parties in the scheme comprise an authorized subset capable of reconstructing a secret. In this case, it is possible to reconstruct a secret, even in the presence of a qualified minority of participants providing a no share by discarding the no shares of the minority of participants through combinations of any or threshold number of participants (t) until a sufficient number of yes shares are combined. Hence, by attempting to combine the shares of all t-subsets of the participants, it is possible to re-construct the secret as long as there are enough yes shares, regardless of whether there are participants who contribute their no shares. Such an attack can be carried out efficiently when the threshold value (t) is either small or close to the total number of parties (n). Given this potential exploitability as well as other disadvantages discussed more below of prior approaches to yes and no secret sharing, continued improvement in secret sharing is needed.

The present disclosure generally relates to a secret sharing scheme that includes hidden access structures and provides for yes and no shares. Such a scheme may provide the advantages of yes and no shares to allow a qualified minority of participants in the secret sharing scheme to deny secret reconstruction by providing no shares. In addition, through the use of hidden access structures, circumvention of the no shares of the qualified minority by other participants in the scheme may be avoided as the access structure for the secret sharing scheme remains hidden until and unless the secret is successfully reconstructed.

In addition to facilitating a solution to the circumvention of provided no shares in a scheme with a public access structure, the present disclosure facilitates a secret sharing scheme which provides complete deniability to participants who want to prevent secret reconstruction. That is, through use of a hidden access structure and by providing no shares that are indistinguishable from yes shares to other participants, none of the participants sharing a no share may be detected by the other participants. Deniability is useful to prevent retaliatory actions from other parties who may wish to reconstruct the secret.

In the following discussion, support for a secret sharing scheme with hidden access structures is supported. Thereafter, a secret sharing scheme in which hidden access structures is generalized to include yes and no secret sharing.

Initially, an access structure may be defined. Let $\mathcal{P} = \{P_1, \ldots, P_\ell\}$ be a set of parties in the secret sharing scheme. A collection $\Gamma \subseteq 2^{\mathcal{P}}$ is monotone if $\mathcal{A} \in \Gamma$ and $\mathcal{A} \subseteq \mathcal{B}$ imply that $\mathcal{B} \in \Gamma$. Accordingly, an access structure $\Gamma \subseteq 2^{\mathcal{P}}$ may be defined that is a monotone collection of non-empty subsets of P. Sets in the access structure ($\Gamma$) are called authorized, and sets not in the access structure ($\Gamma$) are called unauthorized. The access structure may comprise a hidden access structure such as the secret sharing scheme described in U.S. patent application Ser. No. 17/018,899 entitled "PRIVACY PRESERVING SECRET SHARING FROM NOVEL COMBINATORIAL OBJECTS" filed on 11 Sep. 2020, the entirety of which is incorporated by reference herein.

If the access structure ($\Gamma$) consists of all subsets of the participants P with size greater than or equal to a fixed threshold $t(1 \leq t \leq \ell)$, then the access structure ($\Gamma$) is called a t-threshold access structure. Also, a minimal authorized subset may be defined. For an access structure ($\Gamma$), the family of minimal authorized subsets $\Gamma_0 \in \Gamma$ is defined as:

$$\Gamma_0 = \{\mathcal{A} \in \Gamma : \mathcal{B} \subset \mathcal{A} \text{ for all } \mathcal{B} \in \Gamma \setminus \{\mathcal{A}\}\}.$$

The family of minimal authorized subsets ($\Gamma_0$) uniquely determines the access structure ($\Gamma$), and it holds that $\Gamma = \text{cl}(\Gamma_0)$, where cl denotes closure.

With the access structure ($\Gamma$) having been defined with a family of minimal authorized subsets ($\Gamma_0$), a perfect secret sharing scheme with hidden access structures may be created with respect to a collection of access structures ($\mathcal{A}$), a set of $\ell$ number of parties ($\mathcal{P} = \{P_1, \ldots, P_\ell\}$), and a set of secrets ($\mathcal{K}$). The secret sharing scheme includes a pair of polynomial-time algorithms. The first is an algorithm that creates shares in the scheme and is referred to as Share. The second algorithm is a deterministic algorithm used to attempt to reconstruct the secret and is referred to as Recon. Specifically, Share is a randomized algorithm that gets a secret (k) that belongs to the set of secrets ($\mathcal{K}$). Stated differently, $k \in \mathcal{K}$. Share also receives an access structure ($\Gamma$) that is an element of the set of access structures ($\mathbb{A}$). That is, $\Gamma \in \mathbb{A}$. As noted above, the access structure ($\Gamma$) may be a hidden access structure that defines a minimal authorized subset of participants, which is not publicly known prior to secret reconstruction. The secret (k) and access structure ($\Gamma$) are inputs to Share, which outputs a number of yes shares ($\Pi$) of the secret (k) corresponding to the number of participants ($\ell$). The shares may be referred to as $\{\Pi_1^{(\Gamma, k)}, \ldots, \Pi_\ell^{(\Gamma, k)}\}$.

The Recon algorithm is a deterministic algorithm that gets as input the shares ($\Pi$) of a subset of participants ($\mathcal{A} \subseteq \mathcal{P}$), denoted by $\{\Pi_i^{(\Gamma, k)}\}_{i \in \mathcal{A}}$. In turn, Recon outputs a pair (b, k) where $b \in \{0, 1\}$ and $k \in \mathcal{K} \cup \{\bot\}$. Specifically, the Recon algorithm outputs the pair (b, k) such that, four conditions may be satisfied as discussed below.

The first condition may be perfect authorization verification. In this condition, for all secrets belonging to the set of secrets ($k \in \mathcal{K}$) and every subset of participants or all participants ($\mathcal{A} \in P$), Recon may return a true value (1) when the shares of the participant subset of participants ($\{\Pi_i^{(\Gamma,k)}\}_{i\in\mathcal{A}}$) include shares of a minimal authorized subset. Otherwise, Recon may return a false (0) value. Stated mathematically:

$$Pr\left[Recon\left(\left\{\prod_i^{(\Gamma,k)}\right\}_{i\in\mathcal{A}}, \mathcal{A}\right)[1] = 1\right] = 1 \text{ if } \mathcal{A} \in \Gamma,$$

and $$Pr\left[Recon\left(\left\{\prod_i^{(\Gamma,k)}\right\}_{i\in\mathcal{A}}, \mathcal{A}\right)[1] = 0\right] = 1 \text{ if } \mathcal{A} \notin \Gamma,$$

The Recon algorithm may also exhibit perfect correctness. That is, for all secrets belonging to the set of secrets ($k \in \mathcal{K}$) and every authorized set belonging to the access structure ($\mathcal{A} \in \Gamma$), Recon returns the secret (k) from inputs of the shares (Π) or $$Pr\left[Recon\left(\left\{\prod_i^{(\Gamma,k)}\right\}_{i\in\mathcal{A}}, \mathcal{A}\right) = (1, k)\right] = 1,$$

The Recon algorithm may also have perfect secrecy. That is, for every unauthorized subset not belonging to the access structure ($\mathcal{B} \notin \Gamma$) and all secrets belonging to the set of secrets ($k_1, k_2, \in \mathcal{K}$), the distributions $\{\Pi_i^{(\Gamma,k_1)}\}_{i\in\mathcal{B}}$ and $\{\Pi_i^{(\Gamma,k_2)}\}_{i\in\mathcal{B}}$ may be identical.

The Recon algorithm may also exhibit perfect access structure hiding. That is, for every unauthorized subset not belonging to the access structure ($\mathcal{B} \in \Gamma$), every access structure belonging to the set of access structures ($\Gamma' \in \mathbb{A}$) with unauthorized subsets not belonging to the access structure ($\mathcal{B} \in \Gamma$) and all secrets of the set of secrets ($k \in \mathcal{K}$), the distributions $\{\Pi_i^{(\Gamma,k)}\}_{i\in\mathcal{B}}$ and $\{\Pi_i^{(\Gamma',k)}\}_{i\in\mathcal{B}}$ may be identical.

Have set forth a secret sharing scheme with hidden access structures, the foregoing scheme may be generalized to include "yes and no" secret sharing. Specifically, the scheme may be defined with respect to a collection of access structures ($\mathcal{A}$), a set of a number ($\ell$) of parties ($\mathcal{P} = \{P_1, \ldots, P_\ell\}$), and a set of secrets $\mathcal{K}$, consists of a pair of polynomial-time algorithms Share and Recon.

With respect to the Share algorithm, Share receives as an input a secret belonging to the set of secrets ($k \in \mathcal{K}$) and access structure belonging to a set of access structures ($\Gamma \in \mathbb{A}$). In turn, Share outputs a number of shares equal to the number of participating parties ($\ell$) in ordered pairs of yes and no shares of the secret defined as $\{(\Pi_1^{(\Gamma,k)}, \psi_1^{(\Gamma,k)}), \ldots, (\Pi_\ell^{(\Gamma,k)}, \Psi_\ell^{(\Gamma,k)})\}$.

One example of how the Share algorithm generates the yes shares (Π) and no shares (Y) is presented. In an example, the Share algorithm may be performed by an entity referred to as a dealer. The dealer may or may not be a party of the secret sharing scheme. In the secret sharing scheme, the set of parties is defined as $\mathcal{P} = \{P_1, P_2 \ldots, P_n\}$. As described above, the scheme also includes hidden access structures. In the example described, the family of access structures include access structures which have only a single minimal authorized subset defined as:

$$\mathbb{A} = \{\Gamma \subseteq 2^\mathcal{P}: \Gamma \text{ is an access structure with } |\Gamma_0| = 1\}.$$

In turn, the dealer determines a particular access structure (T) selected from the family of access structures in which m is the size of the unique minimal authorized subset. Without loss of generality, $$\Gamma = \{A \in 2^\mathcal{P}: A \supseteq \{P_1, P_2, \ldots, P_m\}\}.$$

The dealer chooses a random basis (B) from a vector space ($\mathbb{F}^{2n}$) of a finite field ($\mathbb{F}$). The random basis (B) comprises a plurality of basis vectors ($\{e_1, e_2, \ldots, e_{2n}\}$). The basis vectors can be used to form any given vector in the vector space in a unique manner. Stated mathematically, the dealer chooses a random basis $B = (\{e_1, e_2, \ldots, e_{2n}\})$.

The dealer also computes a target vector (s) using basis vectors from the random basis (B). Specifically, the target vector (s) is calculated from a target subset of the basis vectors, where the target subset corresponds to the unique minimal authorized subset. That is, $s = e_1 + e_2 + \ldots + e_m$. As will be described in greater detail below, the target vector (s) is related to the secret in that the secret is a function of the target vector.

The dealer also chooses a random vector (h) from the vector space ($\mathbb{F}^{2n}$) or, stated mathematically, $h \in \mathbb{F}^{2n}$. In turn, the secret may be defined as a function of the target vector and the random vector to generate a scalar belonging to the finite field or $\langle s, h \rangle \in \mathbb{F}$. In one example, the function may comprise an inner product or dot product of the target vector and the random vector to generate the secret from the target vector and the random vector.

For each party in the secret sharing scheme, the dealer generates a yes share. A yes share is a function of the target vector (s), a basis vector (et), and the random vector (h). Stated mathematically, for each $P_i \in \mathcal{P}$ ($1 \leq i \leq n$) a yes share is $\Pi_i = (s, e_i, \langle e_i, h \rangle)$.

Specifically, a yes share takes the form $\Pi_i = (s, e_i, \langle e_i, h \rangle)$. As can be appreciated, yes shares include m authorized yes shares generated from the basis vectors from the target subset $e_1 + e_2 + \ldots + e_m$. Others of the yes shares are generated from basis vectors of the random basis outside the target subset or the $(e_{m+1}, \ldots, e_n)$ basis vectors of the random basis (B). However, authorized yes shares are indistinguishable from other yes shares once generated by the dealer. The m number of authorized yes shares are distributed to the minimal authorized subset of parties, although none of the parties are aware of this, as the access structure is hidden as described above.

The dealer also generates a no share for each party of the scheme. The no share is a function of basis vectors outside of the target vector (s) and the basis vectors used for the yes shares and the random vector (h). Stated mathematically, For each $P_i \in \mathcal{P}$ ($1 \leq i \leq n$) its no share is $\psi_i = (s, e_{i+n}, \langle e_{i+n}, h \rangle)$.

Turning to share reconstruction, the algorithm Recon is provided to combine shares provided by the participants in an effort to reconstruct the secret. The participants may comprise a subset of the parties of the scheme. The participants may include all parties in the scheme or subset including fewer than all parties in the scheme. The algorithm Recon is a deterministic algorithm that gets as input one share (Φ) from each party, without a priori knowledge of whether the share (Φ) from any given party is a yes share (Π) or a no share (ψ). The shares are provided from a subset of participants of the parties in the scheme ($\mathcal{A} \subseteq \mathcal{P}$). The shares which are unknown to be yes shares or no shares may be denoted by $\{\Phi_i^{(\Gamma,k)}\}_{i\in\mathcal{A}}$, where each unknown share ($\Phi_i^{(\Gamma,k)}$) is either equal to a yes share ($\Pi_i^{(\Gamma,k)}$) or a no share ($\psi_i^{(\Gamma,k)}$). The algorithm Recon outputs a pair of values (b, k) where b ∈ {0,1} and k ∈ $\mathcal{K} \cup \{\bot\}$. That is, the value b is either a true value (1) or a false value (0) and the value k is the secret when the yes shares for a minimal authorized set is present in the unknown shares ($\Phi$), else an empty value is returned.

Continuing the example above, an instance of the Recon algorithm may receive unknown yes or no shares $\{\Phi_i\}_{i \in \mathcal{A}}$ from a subset of parties $\mathcal{A} \subseteq \mathcal{P}$. Here, the unknown share may be defined as $\Phi_i=(s, f_i, x_i)$. The Recon algorithm determines $\alpha_i$'s such that:

$$s = \sum_{i \in \mathcal{A}} \alpha_i f_i.$$

In this example, if no such $\alpha_i$'s exist, Recon returns a false value and fails to reconstruct the secret (0, $\bot$). Otherwise, Recon returns a true value and returns the secret (1, $\sum_{i \in \mathcal{A}} \alpha_i x_i$).

The Recon algorithm may satisfy the four conditions noted above for general secret sharing with hidden access structures. That is, Recon in this yes and no secret sharing with hidden access structures may provide perfect authorization verification, perfect correctness, perfect security, and/or perfect access structure hiding.

With specific respect to perfect authorization verification, for all secrets belonging to the set of secrets (k∈ $\mathcal{K}$) and every subset of unknown shares $\{\Phi_i^{(\Gamma,k)}\}_{i \in \mathcal{A}}$ which consists of one share from each party in a subset of parties ($\mathcal{A} \subseteq \mathcal{P}$):

$$Pr\left[Recon\left(\{\Phi_i^{(\Gamma,k)}\}_{i \in \mathcal{A}}, \mathcal{A}\right)[1] = 1\right] = 1 \text{ if } f\left(\{\Phi_i^{(\Gamma,k)}\}_{i \in \mathcal{A}}\right) \in \Gamma;$$

and $$Pr\left[Recon\left(\{\Phi_i^{(\Gamma,k)}\}_{i \in \mathcal{A}}, \mathcal{A}\right)[1] = 0\right] = 1 \text{ if } f\left(\{\Phi_i^{(\Gamma,k)}\}_{i \in \mathcal{A}}\right) \notin \Gamma;$$

where $$f\left(\{\Phi_i^{(\Gamma,k)}\}_{i \in \mathcal{A}}\right) = \left\{i \in \mathcal{A}: \Phi_i^{(\Gamma,k)} = \prod_i^{(\Gamma,k)}\right\}.$$

That is, the function applied by the Recon algorithm may only return a true value and the reconstructed secret where the set of unknown shares input to Recon include the yes shares of the minimal authorized subset of the access structure.

In some scenarios, Recon may also exhibit perfect correctness. That is, for all secrets in the subset of secrets (k∈ $\mathcal{K}$) and every subset of unknown shares received from a participant $(\{\Phi_i^{(\Gamma,k)}\}_{i \in \mathcal{A}})$ where the yes shares are received from the minimal authorized subset of the access structure $(f(\{\Phi_i^{(\Gamma,k)}\}_{i \in \mathcal{A}}) \in \Gamma)$, Recon may return a true value and the secret, or:

$$Pr\left[Recon\left(\{\prod_i^{(\Gamma,k)}\}_{i \in \mathcal{A}}, \mathcal{A}\right) = (1, k)\right] = 1.$$

Specifically, since the basis vectors ($e_i$) form a basis of the vector space ($\mathbb{F}^{2n}$), the only linear combination of the basis vectors ($e_i$) that result in the target vector are the basis vectors from the subset of target vectors, or:

$$s = e_1 + e_2 + \ldots + e_m.$$

Thus the $\alpha_i$'s in the above secret reconstruction algorithm (Recon) will exist if and only if all of $P_1, P_2, \ldots, P_m$ participate and contribute their "yes" shares.

The Recon may exhibit perfect secrecy. That is, unknown shares received from participants in the Recon algorithm individually provide no information regarding the secret. That is, for every subset of unknown shares received from participants $(\{\Phi_i^{(\Gamma,k)}\}_{i \in \mathcal{A}})$ such that $f(\{\Phi_i^{(\Gamma,k)}\}_{i \in \mathcal{A}}) \notin \Gamma$ and all secrets $k_1, k_2 \in \mathcal{K}$, the distributions $\{\Phi_i^{(\Gamma,k_1)}\}_{i \in \mathcal{A}}$ and $\{\Phi_i^{(\Gamma,k_2)}\}_{i \in \mathcal{A}}$ may be identical.

As noted above, if all of $P_1, P_2, \ldots, P_m$ participate in secret reconstruction and contribute their "yes" shares ($\Pi_i = (s, e_i, \langle e_i, h \rangle)$), then performing the reconstruction algorithm (Recon), the parties obtain $\alpha_i=1$ for all $i=1, \ldots, m$ and $\alpha_i=0$ otherwise. Therefore, the reconstructed secret is equal to:

$$\sum_{i \in \mathcal{A}} \alpha_i \langle e_i, h \rangle = \sum_{i=1}^{m} \langle e_i, h \rangle = \left\langle \sum_{i=1}^{m} e_i, h \right\rangle = \langle s, h \rangle.$$

In some examples, the Recon algorithm may provide perfect access structure hiding. That is, no information regarding the nature of the access structure may be provided from any shares prior to secret reconstruction. In other words, for any access structure, upon unsuccessful reconstruction of a secret due to the provided shares of a subset of participants not including the yes shares of a minimal authorized subset, no information regarding the access structure may be provided. Stated mathematically, for all access structures $\Gamma, \Gamma' \in \mathbb{A}$, all subsets of participants $\mathcal{A} \subseteq \mathcal{P}$, all secrets $k \in \mathcal{K}$, and all subsets of unknown shares $\{\Phi_i^{(\Gamma,k)}\}_{i \in \mathcal{A}}$ and $\{\Phi_i^{(\Gamma',k)}\}_{i \in \mathcal{A}}$ such that $f(\{\Phi_i^{(\Gamma,k)}\}_{i \in \mathcal{A}}) \notin \Gamma$, $f(\{\Phi_i^{(\Gamma',k)}\}_{i \in \mathcal{A}}) \notin \Gamma'$, the distributions $\{\Phi_i^{(\Gamma,k)}\}_{i \in \mathcal{A}}$ and $\{\Phi_i^{(\Gamma',k)}\}_{i \in \mathcal{A}}$ are identical.

Consider a subset of shares that are unknown to be yes shares or no shares $(\{\Phi_i\}_{i \in \mathcal{A}})$ such that $\{i \in \mathcal{A}: (f(\{\Phi_i^{(\Gamma,k)}\}_{i \in \mathcal{A}})_i = \Pi_i\} \in \theta$. The unknown shares may be described as $\Phi_i=(s, f_i, x_i)$. By the above assumption, the target vector (s) does not lie in the span of $\{f_i\}_{i \in \mathcal{A}}$. Let $\mathcal{U}_\ell$ be the distribution on $$\underbrace{\mathbb{F}^{2n} \times \ldots \times \mathbb{F}^{2n}}_{\ell \text{ times}}$$

that selects the total number of participants in the secret sharing scheme ($\ell$) linearly independent vectors from $\mathbb{F}^{2n}$ uniformly at randomly. Note that $$\{(s, f_i, x_i)\}_{i \in \mathcal{A}} \equiv \left\{(t, g_i, y_i): t, g_1, \ldots, g_{|\mathcal{A}|} \leftarrow \mathcal{U}_{|\mathcal{A}|+1}, y_i \xleftarrow{\$} \mathbb{F}\right\}_{1 \leq i \leq |\mathcal{A}|}.$$

Indeed, since $x_i = \langle f_i, h \rangle$ for linearly independent $\{f_i\}_{i \in \mathcal{A}}$ and some uniformly random $h \in \mathbb{F}^{2n}$, the $x_i$'s are independent and uniform elements of $\mathbb{F}$.

In fact, the secret is equally likely to be any element of the field ($\mathbb{F}$) even with knowledge of 2n−1 shares which do not include all the yes shares of the minimal authorized subset $(\Pi_1, \Pi_2, \ldots, \Pi_m)$. Assume, without loss of generality, that an adversary has all the yes shares $\Pi_i=(s, e_i, x_i)$ and all the no shares $\psi_i=(s, e_{i+n}, y_i)$ except the yes share $\Pi_1$. Solving the equations $$\langle e_2, h \rangle = x_2, \ldots, \langle e_n, h \rangle = x_n, \langle e_{n+1}, h \rangle = y_1, \ldots, \langle e_{2n}, h \rangle = y_n$$

for the random vector (h), one obtains that h lies in an affine subspace of dimension $2n-(2n-1)=1$.

Now, since the target vector (s) does not lie in the span of $\{e_2, e_3, \ldots, e_{2n}\}$, for any $\gamma \in \mathbb{F}$, adding the equation $\langle s, h \rangle = \gamma$ to the above system of equations always results in a unique solution for h. Hence, without any further information available to the adversary, $\langle s, h \rangle$ is equally likely to be any element of $\mathbb{F}$, thus preventing the reconstruction of the secret by the adversary.

With reference to FIG. 1, an example of a secret sharing scheme 100 is depicted schematically. The scheme 100 includes a share generator 110. The share generator 110 may comprise a share generation module executable by a computing device comprising the share generator at a dealer entity 112. The dealer entity 112 may be a party in the secret sharing scheme (e.g., a party that receives shares of a secret). Alternatively, the dealer entity 112 may be a third party outside the secret sharing scheme 100 (e.g., the dealer entity 112 may not receive shares of a secret). The share generator 110, as described above, chooses a random basis from a vector space over a finite field. The random basis includes a plurality of basis vectors that can be used to form any given vector in the vector space in a unique manner. The share generator 110 may receive a secret (k) 130. In turn, the share generator 110 calculates a target vector corresponding to the secret (k) 130. The target vector may be calculated using a target subset of the basis vectors, the number of which may be equal to the number of members of a minimal authorized subset of the parties. The share generator 110 also chooses a random vector.

In turn, the share generator 110 may utilize the share generation algorithm (e.g., Share described above) to generate yes shares ($\{\Pi_1^{(k)}, \ldots \Pi_\ell^{(k)}\}$) and no shares ($\{\psi_1^{(k)}, \ldots \Psi_\ell^{(k)}\}$) that are distributed to the parties 120. Specifically, a yes share ($\Pi$) and a no share (Y') are distributed to each of the parties 120. As described above, the yes shares for a minimal authorized subset of the parties 120 are generated from the target subset of the basis vectors used to calculate the target vector corresponding to the secret. The yes shares for parties 120 outside the minimal authorized subset are generated from basis vectors outside the target subset of basis vectors. Also, all no shares are generated using basis vectors outside the target subset of basis vectors.

The share generator 110 may comprise a computing device comprising, for example, one or more hardware processors and memory devices. The hardware processors may access the share generation algorithm, which may be stored in a memory device of the share generator 110. In turn, the one or more hardware processors of the share generator 110 may execute the share generation algorithm to generate the yes shares and no shares. The shares may be communicated to the parties 120a, 120b, ... 120n, which themselves may be computing devices comprising one or more hardware processors and memory devices. The shares may be communicated to the parties 120 by way of a network or other digital communication methodology. In this regard, the shares may be stored in a respective memory device of the party 120 that receives the shares. As described above, the secret 130 may comprise data received at the share generator 110. A share may comprise share data that is provided to and stored in a memory device of each respective parties 120.

Figure 2:
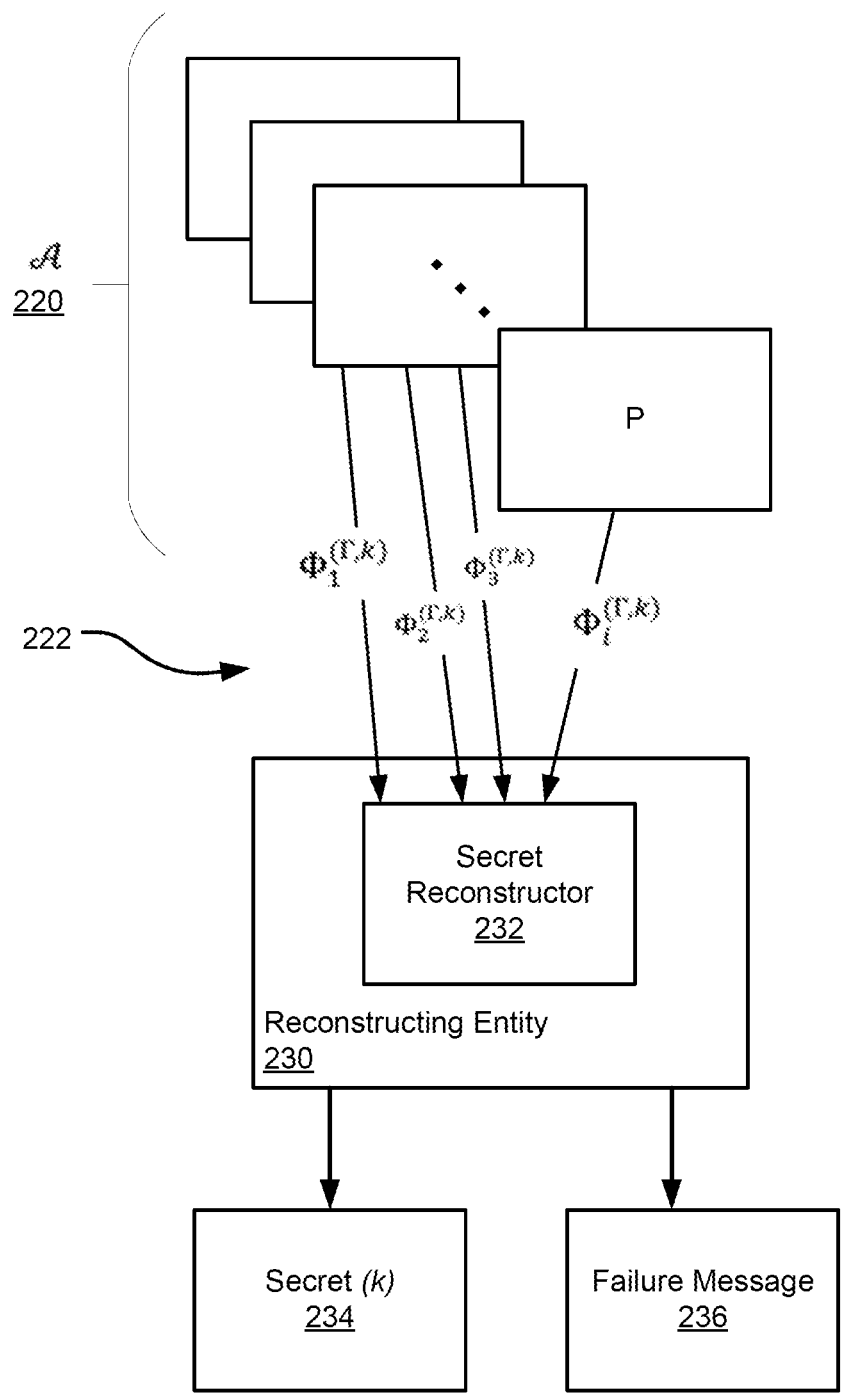
FIG. 2 illustrates an example of secret reconstruction from a subset of participating parties.

In turn, with further reference to FIG. 2, when a subset of parties or participants ($\mathcal{A}$) 220 wish to attempt a secret reconstruction, the subset of the participants ($\mathcal{A}$) 220 comprising the par may each provide a share ($\Phi$) 222, which is unknown to be a yes share ($\Pi$) or a no share ($\psi$) to a reconstructing entity 230. In turn, the reconstructing entity 230 may have a secret reconstructor 232, which may comprise a reconstruction algorithm such as Recon discussed above. The reconstructing entity 230 may comprise a member of the subset of participants ($\mathcal{A}$) 220 or be a third party outside the subset of participants ($\mathcal{A}$) 220. In the event the reconstructing entity is a member of the subset of participants ($\mathcal{A}$) 220, the reconstructing entity may contribute a share ($\Phi$) 222 as an input to the secret reconstructor 232 in addition to receiving a share ($\Phi$) 222 from at least one other member of the subset of participants ($\mathcal{A}$) 220.

The secret reconstructor 232 may comprise a computing device comprising, for example, one or more hardware processors and memory devices. The hardware processors may access the secret reconstruction algorithm, which may be stored in a memory device of the secret reconstructor 232. In turn, the one or more hardware processors of the secret reconstructor 232 may execute the secret reconstruction algorithm with shares ($\Phi$) 222 to attempt to reconstruct a secret. The shares ($\Phi$) 222 may be received from the subset of participants ($\mathcal{A}$) 220, which themselves may be computing devices comprising one or more hardware processors and memory devices. The shares ($\Phi$) 222 may be received from the subset of participants ($\mathcal{A}$) 220 by way of a network or other digital communication methodology. In this regard, the shares ($\Phi$) 222 may be stored in a respective memory device of the reconstructing entity 230 that receives the shares.

In turn, the secret reconstructor 232 may attempt to compute the target vector corresponding to a secret (k) 234 using each of the shares ($\Phi$) 222 as an input to a secret reconstruction algorithm. If all yes shares ($\Pi$) are present of a minimal authorized subset in the shares ($\Phi$) 222, then the secret reconstructor 232 may output the secret (k) 234. In contrast, if not all yes shares ($\Pi$) are present of a minimal authorized subset in the shares (@) 222, then a failure message 236 may be returned. As may be appreciated, this may be a result when not all members of a minimal authorized subset of parties are present in the subset of participants ($\mathcal{A}$) 220 or may result from one or more of a minimal authorized subset contributing a no share ($\psi$). In addition, upon returning the failure message 326, no information regarding the access structure may be derived by any of the participants. In addition, when the failure message 236 is returned, no information regarding the nature of the shares ($\Phi$) 222 may be derived, such that a member of the minimal authorized subset may maintain deniability regarding whether a yes share ($\Pi$) or a no share ($\psi$) was provided.

Figure 3:
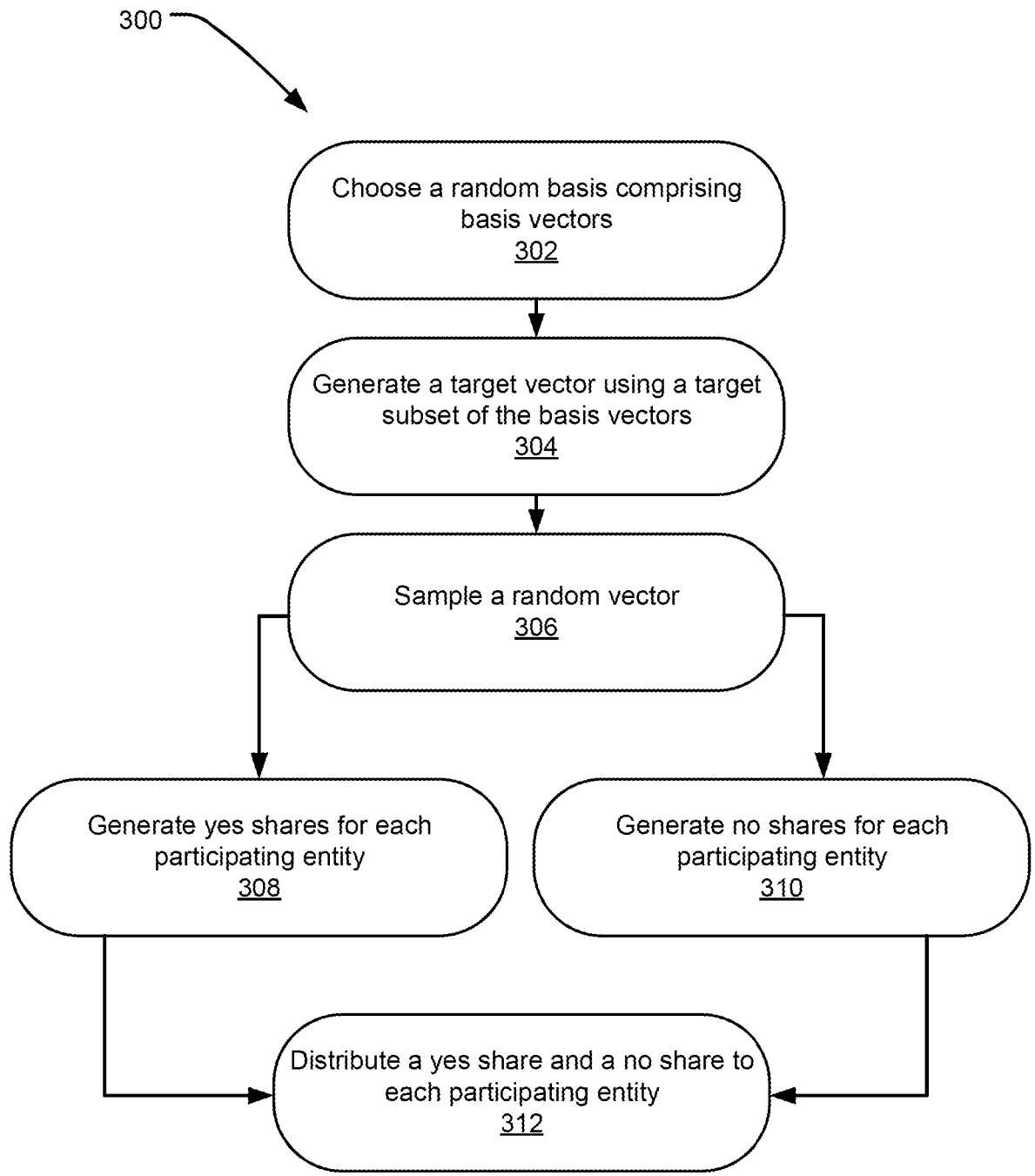
FIG. 3 illustrates example operations for secret generation.

FIG. 3 illustrates example operations 300 for generation of shares in a yes and no secret sharing scheme with hidden access structures as described above. In a choosing operation 302, a random basis is chosen that comprises a plurality of basis vectors. In a generating operation 304, a target vector corresponding to a secret is generated using a target subset of the basis vectors. Also, a sampling operation 306 samples a random vector. In turn, the operations 300 include a generating operation 038 in which yes shares are generated for each party in the scheme. The yes shares include authorized yes shares corresponding to a minimal authorized subset of parties. The number of authorized yes shares correspond to a number of parties in the minimal authorized subset, and the authorized yes shares are each generated using a different one of the basis vectors in the target subset used to generate the target vector in the generating operation 304. The yes shares also include shares generated outside the target subset of basis vectors for parties outside the minimal authorized subset. However, an authorized yes share may be indistinguishable from a non-authorized yes share even among the parties of the scheme. That is, a party of the scheme may not be aware of whether or not the party is a member of the minimal authorized subset. While each party may not be capable of distinguishing an authorized yes share from other, non-authorized yes shares, each party receives a yes share and a no share, which are distinguishable by a party, but undistinguishable to others of the parties. Furthermore, a generating operation 310 is used to generate a no share for each party. As noted above, each party may distinguish their own yes share from the no share, but the yes share and the no share of a given party are not distinguishable to other parties in the scheme. A distributing operation 312 includes distributing a yes share and a no share to each party in the scheme.

Figure 4:
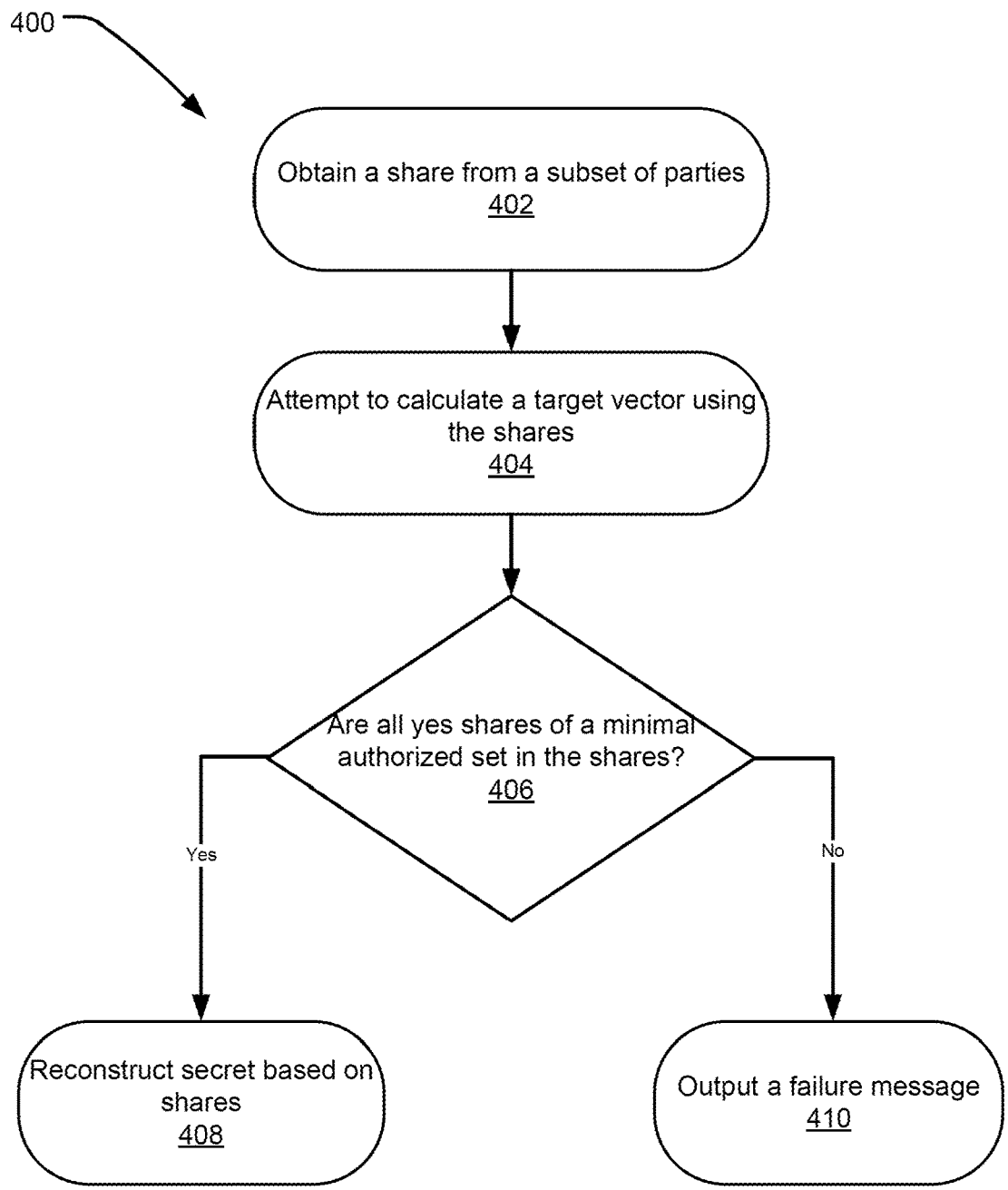
FIG. 4 illustrates example operations for secret reconstruction.

With further reference to FIG. 4, example operations 400 for secret reconstruction are shown. The operations 400 include an obtaining operation 402 that includes obtaining shares from a participating subset of the parties of the scheme comprising participants in the reconstruction. The obtaining operation 402 may include receiving a share from another participant in the scheme and/or combining a share possessed by the entity conducting the reconstruction. In other examples, each participant in the subset of parties may pool shares such that each participant may each independently attempt secret reconstruction using the pooled shares.

The operations 400 also include a calculating operation 404 in which the reconstructing entity attempts to calculate a target vector using the shares obtained in the obtaining operation 402. The calculating operation 404 may include inputting the obtained shares into a reconstruction algorithm. In turn, a determining operation 406 may determine if all yes shares of a minimal authorized subset are present. If so, a reconstruction operation 408 occurs in which the secret is reconstructed. Otherwise, the determining operation 406 may result in an outputting operation 410 in which a failure message is output.

Figure 5:
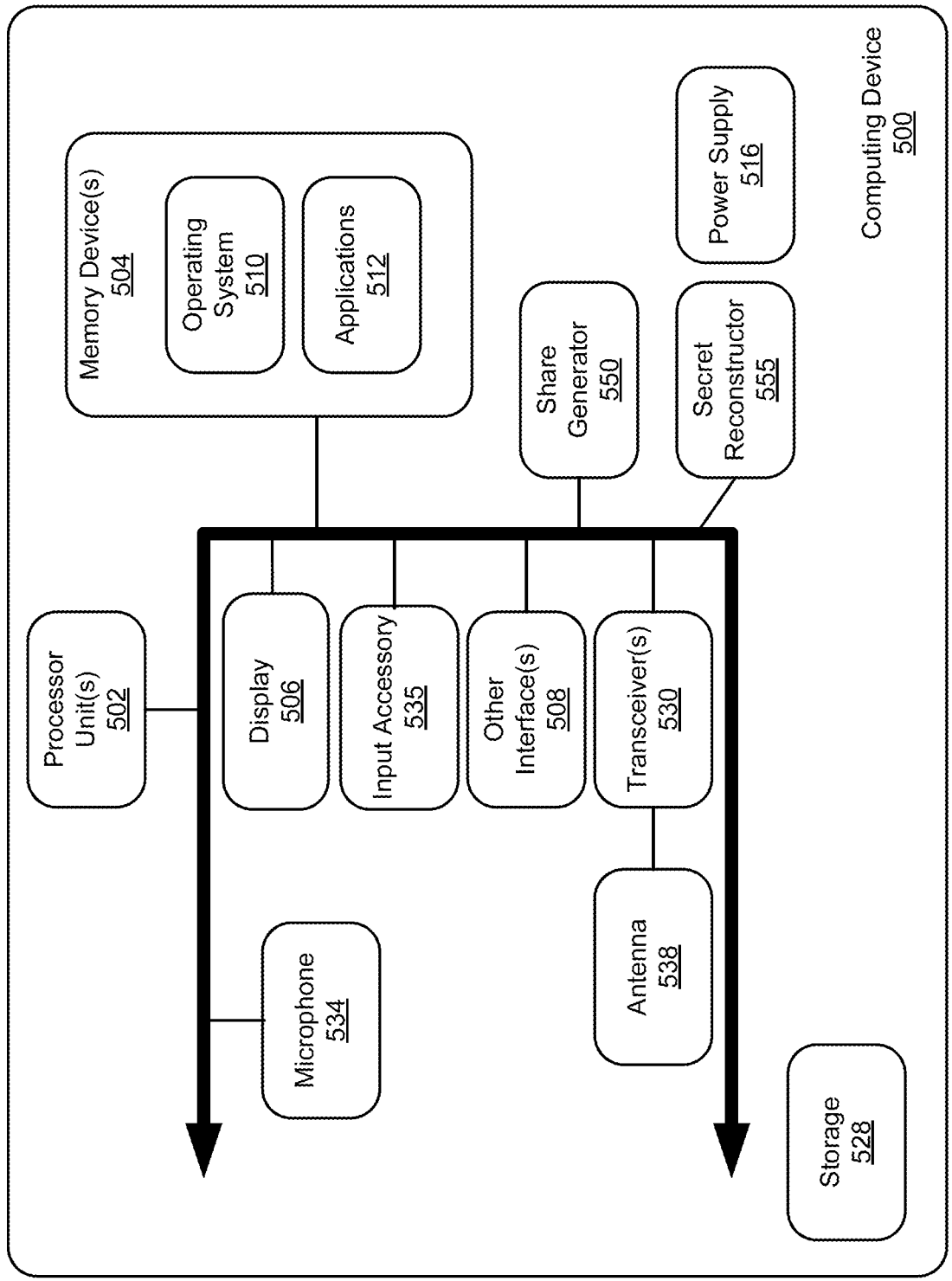
FIG. 5 illustrates an example of a computing device capable of providing functionality associated with the secret sharing scheme described herein.

FIG. 5 illustrates an example schematic of a computing device 500 suitable for implementing aspects of the disclosed technology including a share generator and/or secret reconstructor as described above. The computing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows R operating system, the Apple macOS operating system, or the Linux operating system, resides in the memory 504 and is executed by the processor unit(s) 502, although it should be understood that other operating systems may be employed.

One or more applications 512 are loaded in the memory 504 and executed on the operating system 510 by the processor unit(s) 502. Applications 512 may receive input from various input local devices such as a microphone 534, input accessory 535 (e.g., keypad, mouse, stylus, touchpad, joystick, instrument mounted input, or the like). Additionally, the applications 512 may receive input from one or more remote devices such as remotely located smart devices by communicating with such devices over a wired or wireless network using more communication transceivers 530 and an antenna 538 to provide network connectivity (e.g., a mobile phone network, Wi-Fi®, Bluetooth®). The computing device 500 may also include various other components, such as a positioning system (e.g., a global positioning satellite transceiver), one or more accelerometers, one or more cameras, an audio interface (e.g., the microphone 534, an audio amplifier and speaker and/or audio jack), and storage devices 528. Other configurations may also be employed.

The computing device 500 further includes a power supply 516, which is powered by one or more batteries or other power sources and which provides power to other components of the computing device 500. The power supply 516 may also be connected to an external power source (not shown) that overrides or recharges the built-in batteries or other power sources.

In an example implementation, the computing device 500 comprises hardware and/or software embodied by instructions stored in the memory 504 and/or the storage devices 528 and processed by the processor unit(s) 502. The memory 504 may be the memory of a host device or of an accessory that couples to the host. Additionally or alternatively, the computing device 500 may comprise one or more field programmable gate arrays (FGPAs), application specific integrated circuits (ASIC), or other hardware/software/firmware capable of providing the functionality described herein.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

One general aspect of the present disclosure includes a method for generating shares for a secret sharing scheme. The method includes choosing a random basis for a vector space. The random basis includes a plurality of basis vectors that can be used to form any given vector in the vector space in a unique manner. The method also includes calculating a target vector from a target subset of the plurality of basis vectors. Furthermore, the method includes choosing a random vector from the vector space. A secret of the secret sharing scheme is a function of the target vector and the random vector. In turn, the method includes generating, for a plurality of parties in the secret sharing scheme, a corresponding plurality of yes shares as a function of a basis vector from the plurality of basis vectors and the random vector. The plurality of yes shares comprise authorized yes shares generated as a function of a basis vector from the target subset of the plurality of basis vectors. The secret is only reconstructable by a computation involving the target vector in an operation including all of the authorized yes shares. The method also includes generating, for each of the plurality of parties in the secret sharing scheme, a no share as a function of a basis vector outside the target subset of the plurality basis vectors and the random vector. The method also includes distributing a yes share and a no share to each of the plurality of parties in the secret sharing scheme. The authorized yes shares are distributed to a minimal authorized subset of the plurality of parties in the secret sharing scheme.

Implementations may include one or more of the following features. For example, the minimal authorized subset of participants may be unknown to the plurality of parties in the secret sharing scheme prior to reconstruction of the secret. In addition, the yes share and the no share of any party of the plurality of parties may be indistinguishable to others of the plurality of parties. Further still, the yes share and the authorized yes shares may be indistinguishable to the plurality of parties.

In an example, the secret sharing scheme is unconditionally secure.

In an example, the method may include determining an access structure defining a number of the minimal authorized subset of participants. A number of the target vectors in the target subset may correspond to the number of the minimal authorized subset of participants. The minimal authorized subset may be a function of a hidden access structure that is not known to the plurality of parties in the scheme. In an example, no information regarding the access structure may be available to the plurality of parties participating in the secret sharing scheme prior to successful reconstruction of the secret.

In an example, the method may also include obtaining a plurality of shares. Specifically, the plurality of shares are unknown to be yes shares or no shares. The method may also include combining the plurality of shares to attempt to compute the secret and reconstructing the secret only in response to all the yes shares of the minimal authorized subset of participants being present in the plurality of shares. Otherwise the method may fail to reconstruct the secret in response to not all the yes shares of the minimal authorized subset of participants being present in the plurality of shares.

Another general aspect of the present disclosure includes a method for reconstruction of a secret in a secret sharing scheme. The method includes obtaining a plurality of shares from a corresponding plurality of participants. The plurality of shares are unknown to be yes shares or no shares. A minimal authorized subset of the plurality of participants is unknown to the plurality of participants prior to secret reconstruction. The method also includes combining the plurality of shares to attempt to compute a secret. The secret is a function of a target vector. The method includes reconstructing the secret only in response to all the yes shares of the minimal authorized subset of the participants being present in the plurality of shares, otherwise failing to reconstruct the secret in responses to not all of the yes shares of the minimal authorized subset of participants being present in the plurality of shares.

Implementations may include one or more of the following features. For example, the obtaining may include including receiving at least one share from another party in the secret sharing scheme. The minimal authorized subset of participants may be unknown to a plurality of parties participating in the secret sharing scheme.

In an example, the yes shares may be generated as a function of a basis vector from a plurality of basis vectors of a random basis for a vector space and a random vector. The yes shares may include authorized yes shares generated as a function of a basis vector from a target subset of the plurality of basis vectors. The target subset of the plurality of basis vectors may be used to calculate the target vector. The no shares may be generated as a function of a basis vector outside the target subset of the plurality basis vectors and the random vector.

In an example, the yes share and the no share of any party of the plurality of parties may be indistinguishable to others of the plurality of parties. The yes share and the authorized yes shares may be indistinguishable to the plurality of participants.

In an example, the secret sharing scheme may be unconditionally secure.

In an example, the minimal authorized subset of the participants may be determined by an access structure. In turn, a number of the target vectors in the target subset may correspond to the number of the minimal authorized subset of participants. In addition, no information regarding the access structure may be available to the plurality of parties in the secret sharing scheme prior to successful reconstruction of the secret.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description are to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for reconstruction of a secret shared amongst a plurality of computing devices in a secret sharing scheme, comprising:
    obtaining, at a hardware processor of a secret reconstructor, a plurality of shares from a corresponding plurality of participants comprising respective computing devices of the plurality of computing devices capable of storing a share in memory, wherein the plurality of shares are unknown to be yes shares or no shares, and wherein a minimal authorized subset of the plurality of participants is unknown to the plurality of participants prior to secret reconstruction;
    combining, using the hardware processor of the secret reconstructor, the plurality of shares to attempt to compute a secret, which is a function of a target vector; and
    reconstructing, using the hardware processor of the secret reconstructor, the secret only in response to all the yes shares of the minimal authorized subset of the participants being present in the plurality of shares, otherwise failing to reconstruct the secret in responses to not all of the yes shares of the minimal authorized subset of participants being present in the plurality of shares.

2. The method of claim 1, wherein the obtaining comprises including receiving at least one share from another party in the secret sharing scheme.

3. The method of claim 1, wherein the minimal authorized subset of participants is unknown to a plurality of parties participating in the secret sharing scheme.

4. The method of claim 1, wherein the yes shares are generated as a function of a basis vector from a plurality of basis vectors of a random basis for a vector space and a random vector, wherein the yes shares comprise authorized yes shares generated as a function of a basis vector from a target subset of the plurality of basis vectors, wherein the target subset of the plurality of basis vectors is used to calculate the target vector.

5. The method of claim 4, wherein the no shares are generated as a function of a basis vector outside the target subset of the plurality basis vectors and the random vector.

6. The method of claim 4, wherein the yes share and the no share of any party of the plurality of parties are indistinguishable to others of the plurality of parties.

7. The method of claim 6, wherein the yes share and the authorized yes shares are indistinguishable to the plurality of participants.

8. The method of claim 1, wherein the secret sharing scheme is unconditionally secure.

9. The method of claim 1, wherein the minimal authorized subset of the participants is determined by an access structure, wherein a number of the target vectors in the target subset corresponds to the number of the minimal authorized subset of participants.

10. The method of claim 9, wherein no information regarding the access structure is available to the plurality of parties in the secret sharing scheme prior to successful reconstruction of the secret.

* * * * *